(12) United States Patent
Yi et al.

(10) Patent No.: US 10,705,219 B2
(45) Date of Patent: Jul. 7, 2020

(54) METHOD AND APPARATUS FOR UPDATING MAPS

(71) Applicant: Baidu Online Network Technology (Beijing) Co., Ltd., Beijing (CN)

(72) Inventors: Shichun Yi, Beijing (CN); Cheng Wang, Beijing (CN); Li Yu, Beijing (CN); Shiyu Song, Beijing (CN); Baoqiang Xu, Beijing (CN)

(73) Assignee: BAIDU ONLINE NETWORK TECHNOLOGY (BEIJNG) CO., LTD, Beijing (CN)

( * ) Notice: Subject to any disclaimer, the term of this patent is extended or adjusted under 35 U.S.C. 154(b) by 423 days.

(21) Appl. No.: 15/876,032

(22) Filed: Jan. 19, 2018

(65) Prior Publication Data
US 2018/0299557 A1 Oct. 18, 2018

(30) Foreign Application Priority Data

Apr. 17, 2017 (CN) .......................... 2017 1 0248760

(51) Int. Cl.
| | |
|---|---|
| *G01C 3/08* | (2006.01) |
| *G01S 17/89* | (2020.01) |
| *G01C 21/28* | (2006.01) |
| *G01S 17/42* | (2006.01) |
| *G01S 7/48* | (2006.01) |
| *G01S 7/00* | (2006.01) |
| *G01S 17/86* | (2020.01) |

(52) U.S. Cl.
CPC .............. *G01S 17/89* (2013.01); *G01C 21/28* (2013.01); *G01S 7/003* (2013.01); *G01S 7/4808* (2013.01); *G01S 17/42* (2013.01); *G01S 17/86* (2020.01)

(58) Field of Classification Search
None
See application file for complete search history.

(56) References Cited

U.S. PATENT DOCUMENTS

| | | | | |
|---|---|---|---|---|
| 9,835,717 B2 * | 12/2017 | Bosse | ...................... | G01S 17/86 |
| 10,096,129 B2 * | 10/2018 | Narang | ................... | G06T 7/521 |
| 2019/0235083 A1 * | 8/2019 | Zhang | ....................... | G01S 7/51 |

* cited by examiner

*Primary Examiner* — Isam A Alsomiri
*Assistant Examiner* — Amir J Askarian
(74) *Attorney, Agent, or Firm* — Knobbe, Martens, Olson & Bear, LLP

(57) ABSTRACT

The present application discloses a method and apparatus for updating a map. An implementation of the method comprises: acquiring a laser point clouds obtained by scanning a surrounding environment and acquiring a periodic pose change of a vehicle in a scanning period; determining an a priori pose of the laser radar at a reference time in the current scanning period based on a known pose of the laser radar in a previous scanning period and the periodic pose change; performing motion compensation on the scanned laser point clouds to form a compensated point cloud frame; generating a partial point cloud characteristic map; matching the partial point cloud characteristic map with a map area obtained in a reference point cloud map, and correcting the a priori pose to obtain an a posteriori pose; and updating a three-dimensional point cloud map of a to-be-constructed area using the compensated point cloud frame.

15 Claims, 5 Drawing Sheets

METHOD AND APPARATUS FOR UPDATING MAPS

CROSS-REFERENCE TO RELATED APPLICATION

This application claims the benefit of Chinese Application No. 201710248760.8, filed on Apr. 17, 2017, entitled "Method and Apparatus for Updating Map," having Baidu Online Network Technology (Beijing) Co., Ltd. as the applicant, the entire disclosure of which is incorporated herein by reference.

TECHNICAL FIELD

The present application relates to the field of computer technology, specifically to the field of positioning technology, and more specifically to a method and apparatus for updating a map.

BACKGROUND

A three-dimensional point cloud map is generated by projecting point cloud data acquired by a laser radar to a world coordinate system. A high-precision three-dimensional point cloud map is an important part of a driverless technology. It is the basis of route planning and decision making for driverless vehicles, and also provides core data for high-precision self-positioning of a vehicle.

An existing approach of producing a high-precision map usually depends on good satellite navigation signals. When the satellite navigation signal is poor, it is generally difficult to obtain the location pose of the laser radar at each scanning time, so it is difficult to generate a high-precision three-dimensional point cloud map under such a condition.

SUMMARY

Some embodiments of the present application provides an improved method and apparatus for updating a map, to solve the technical problems mentioned in the above background section.

In a first aspect, some embodiments of the present application provide a method for updating a map, and the method includes: acquiring laser point clouds obtained at each scanning time in a current scanning period when a vehicle moves in a to-be-constructed area and uses a vehicle-borne laser radar to scan a surrounding environment, and acquiring a periodic pose change of the vehicle, relative to a start time, at an end time in each scanning period, the periodic pose change obtained by a vehicle-borne inertial navigation system of the vehicle through measurement and calculation; determining an a priori pose of the laser radar at a reference time in the current scanning period based on a known pose of the laser radar at a reference time in a previous scanning period before the current scanning period and a periodic pose change of the current scanning period and/or the previous scanning period; performing motion compensation on the laser point clouds scanned at the each scanning time in the current scanning period by taking the reference time in the current scanning period as a benchmark to form a compensated point cloud frame of the current scanning period; generating a partial point cloud characteristic map used for matching using a characteristic point extracted from the compensated point cloud frame; matching the partial point cloud characteristic map with a map area obtained by performing positioning in a reference point cloud map using a position of the a priori pose, and correcting the a priori pose based on a matching result to obtain an a posteriori pose, the reference point cloud map constructed by using laser point clouds obtained through static scanning by three-dimensional scanners deployed at fixed measurement stations of the to-be-constructed area; and updating a three-dimensional point cloud map of the to-be-constructed area using the compensated point cloud frame in the current scanning period based on the a posteriori pose of the laser radar at the reference time in the current scanning period.

In some embodiments, the method further includes: setting the a posteriori pose of the laser radar at the reference time in the current scanning period as a known pose of the laser radar in the current scanning period to process laser point clouds scanned by the laser radar in a following scanning period.

In some embodiments, the performing motion compensation on the laser point clouds scanned at the each scanning time in the current scanning period by taking the reference time in the current scanning period as a benchmark to form a compensated point cloud frame of the current scanning period includes: determining a pose offset of the pose of the laser radar at the each scanning time in the current scanning period relative to the a priori pose of the laser radar at the reference time in the current scanning period based on the periodic pose change of the current scanning period and/or the previous scanning period; and performing motion compensation on the corresponding laser point clouds scanned at the scanning time based on the pose offset of the laser radar at the each scanning time in the current period, to generate the compensated point cloud frame of the current scanning period.

In some embodiments, the determining the pose offset of the pose of the laser radar at the each scanning time in the current scanning period relative to the a priori pose of the laser radar at the reference time in the current scanning period based on the periodic pose change of the current scanning period includes: calculating the pose offset of the pose of the laser radar at the each scanning time in the current scanning period relative to the a priori pose of the laser radar at the reference time in the current scanning period by considering the pose change of the laser radar in a single scanning period as a uniform change.

In some embodiments, the generating a partial point cloud characteristic map used for matching using a characteristic point extracted from the compensated point cloud frame includes: extracting characteristic points forming a plane and/or a cylinder from the compensated point cloud frame in the current scanning period and the compensated point cloud frame of at least one scanning period adjacent to the current scanning period, respectively; and splicing the characteristic points extracted from a plurality of compensated point cloud frames to form the partial point cloud characteristic map.

In some embodiments, the matching the partial point cloud characteristic map with a map area obtained by performing positioning in a reference point cloud map using a position of the a priori pose, and correcting the a priori pose based on a matching result to obtain an a posteriori pose includes: performing an iterative adjustment on the a priori pose of the laser radar at the reference time in the current period to enable the partial point cloud characteristic map after pose adjustment and the map area to reach an optimal matching state; and correcting the a priori pose using an adjustment amount of the iterative adjustment to obtain the a posteriori pose.

In some embodiments, the method further includes a step of generating the reference point cloud map, and the generating the reference point cloud map includes: measuring spatial coordinates of a three-dimensional scanner deployed at each measurement station of the to-be-constructed area station-by-station in a conductor line controlled measurement mode; performing matching among laser point clouds obtained by scanning a surrounding environment by each three-dimensional scanner to obtain a pose of the each three-dimensional scanner; and splicing the laser point clouds scanned by the each three-dimensional scanner based on the spatial coordinates and the pose of the each three-dimensional scanner to generate the reference point cloud map.

In a second aspect, an embodiment of the present application provides an apparatus for updating a map, and the apparatus includes: an acquiring unit, for acquiring laser point clouds obtained at each scanning time in a current scanning period when a vehicle moves in a to-be-constructed area and uses a vehicle-borne laser radar to scan a surrounding environment, and acquiring a periodic pose change of the vehicle, relative to a start time, at an end time in each scanning period, the periodic pose change obtained by a vehicle-borne inertial navigation system of the vehicle through measurement and calculation; a determining unit, for determining an a priori pose of the laser radar at a reference time in the current scanning period based on a known pose of the laser radar at a reference time in a previous scanning period before the current scanning period and a periodic pose change of the current scanning period and/or the previous scanning period; a motion compensation unit, for performing motion compensation on the laser point clouds scanned at the each scanning time in the current scanning period by taking the reference time in the current scanning period as a benchmark to form a compensated point cloud frame of the current scanning period; a generating unit, for generating a partial point cloud characteristic map used for matching using a characteristic point extracted from the compensated point cloud frame; a correcting unit, for matching the partial point cloud characteristic map with a map area obtained by performing positioning in a reference point cloud map using a position of the a priori pose, and correcting the a priori pose based on a matching result to obtain an a posteriori pose, the reference point cloud map constructed by using laser point clouds obtained through static scanning by three-dimensional scanners deployed at fixed measurement stations of the to-be-constructed area; and an constructing unit, for updating a three-dimensional point cloud map of the to-be-constructed area using the compensated point cloud frame in the current scanning period based on the a posteriori pose of the laser radar at the reference time in the current scanning period.

In some embodiments, the apparatus further includes: a setting unit, for setting the a posteriori pose of the laser radar at the reference time in the current scanning period as a known pose of the laser radar in the current scanning period to process laser point clouds scanned by the laser radar in a following scanning period.

In some embodiments, the motion compensation unit includes: a determining subunit, for determining a pose offset of the pose of the laser radar at the each scanning time in the current scanning period relative to the a priori pose of the laser radar at the reference time in the current scanning period based on the periodic pose change of the current scanning period and/or the previous scanning period; and a motion compensation subunit, for performing motion compensation on the corresponding laser point clouds scanned at the scanning time based on the pose offset of the laser radar at the each scanning time in the current period, to generate the compensated point cloud frame of the current scanning period.

In some embodiments, the determining subunit is further used for: calculating the pose offset of the pose of the laser radar at the each scanning time in the current scanning period relative to the a priori pose of the laser radar at the reference time in the current scanning period by considering the pose change of the laser radar in a single scanning period as a uniform change.

In some embodiments, the generating unit is further used for: extracting characteristic points forming a plane and/or a cylinder from the compensated point cloud frame in the current scanning period and the compensated point cloud frame of at least one scanning period adjacent to the current scanning period, respectively; and splicing the characteristic points extracted from a plurality of compensated point cloud frames to form the partial point cloud characteristic map.

In some embodiments, iteration adjustment is performed on the a priori pose of the laser radar at the reference time in the current period to enable the partial point cloud characteristic map after pose adjustment and the map area to reach an optimal matching state; and the a priori pose is corrected using an adjustment amount of the iteration adjustment to obtain the a posteriori pose.

In some embodiments, the apparatus further includes a reference point cloud map generating unit which is used for: measuring spatial coordinates of a three-dimensional scanner deployed at each measurement station of the to-be-constructed area station-by-station in a conductor line controlled measurement mode; performing matching among laser point clouds obtained by scanning a surrounding environment by each three-dimensional scanner to obtain a pose of the each three-dimensional scanner; and splicing the laser point clouds scanned by the each three-dimensional scanner based on the spatial coordinates and the pose of the each three-dimensional scanner to generate the reference point cloud map.

In a third aspect, some embodiments of the present application provide a device including: one or more processors, and a storage for storing one or more programs, wherein when the one or more programs are executed by the one or more processors, the one or more processors implement the method, for example, as described by any item in the first aspect.

In a fourth aspect, some embodiments of the present application provide a computer readable storage medium on which computer programs are stored, and the computer readable storage medium is characterized in that when the computer programs are executed by the processors, the method, for example, as described by any item in the first aspect is implemented.

According to the method and apparatus for updating a map, provided by some embodiments the present application, an accurate pose of the laser radar at a reference time point of each scanning period is continuously estimated and corrected through a pose change of the laser radar estimated by an inertial navigation system and the matching between a point cloud frame after motion compensation and the reference point cloud map, so that the three-dimensional point cloud map may be updated by using the point cloud frame after motion compensation of each scanning period according to the accurate pose, and a high-precision three-dimensional point cloud map may also be constructed in a scenario that it is impossible or difficult to give priority to the use of a global navigation satellite system to perform effective positioning.

BRIEF DESCRIPTION OF THE DRAWINGS

Other features, objectives and advantages of the present application will become more apparent by reading a detailed description of the non-limiting embodiments made with reference to the following drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
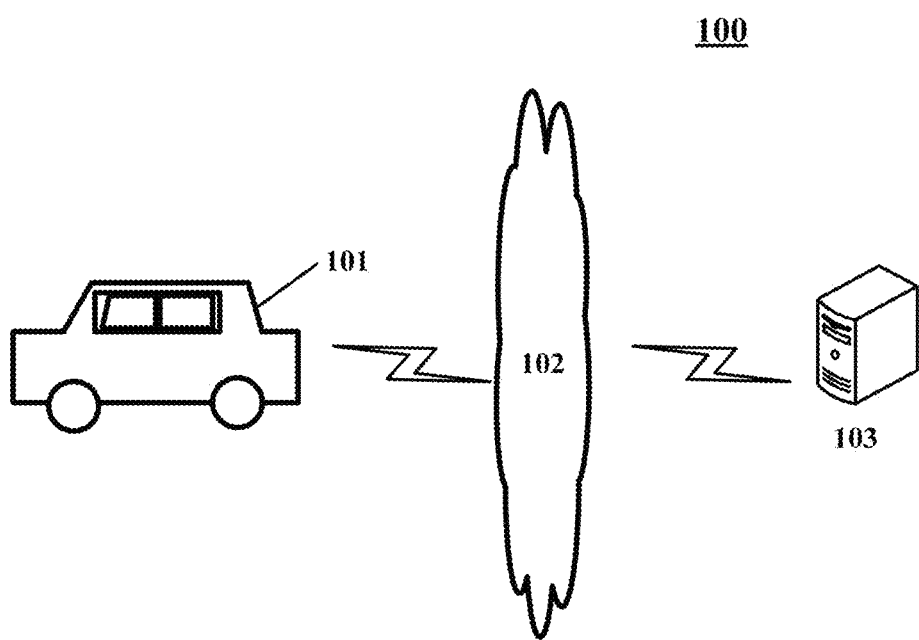
FIG. 1 is an illustrative system architecture diagram to which the present application can be applied according to some embodiments.

FIG. 1 shows an architecture of a system 100 which may be used by a method and apparatus for updating a map according to some embodiments of the present application.

As shown in FIG. 1, the system architecture 100 may include a vehicle 101, a network 102 and a server 103. The network 102 serves as a medium providing a communication link between the vehicle 101 and the server 103. The network 102 may include various types of connections, such as wired or wireless transmission links, or optical fibers.

Various sensors may be mounted on the vehicle to collect corresponding sensor data. The vehicle 101 may transmit the sensor data to the server 103 through the network 102. The server 103 may perform processing such as analysis on the received sensor data so as to generate a processed result, such as a high-precision three-dimensional point cloud map.

It should be noted that the method for updating the map, provided by embodiments of the present application, is generally executed by the server 103, and accordingly, the apparatus for updating the map is generally arranged in the server 103.

It should be appreciated that the numbers of the vehicle, the network, and the server in FIG. 1 are only schematic. According to an implementation requirement, any number of vehicles, networks and servers may be provided.

Figure 2:
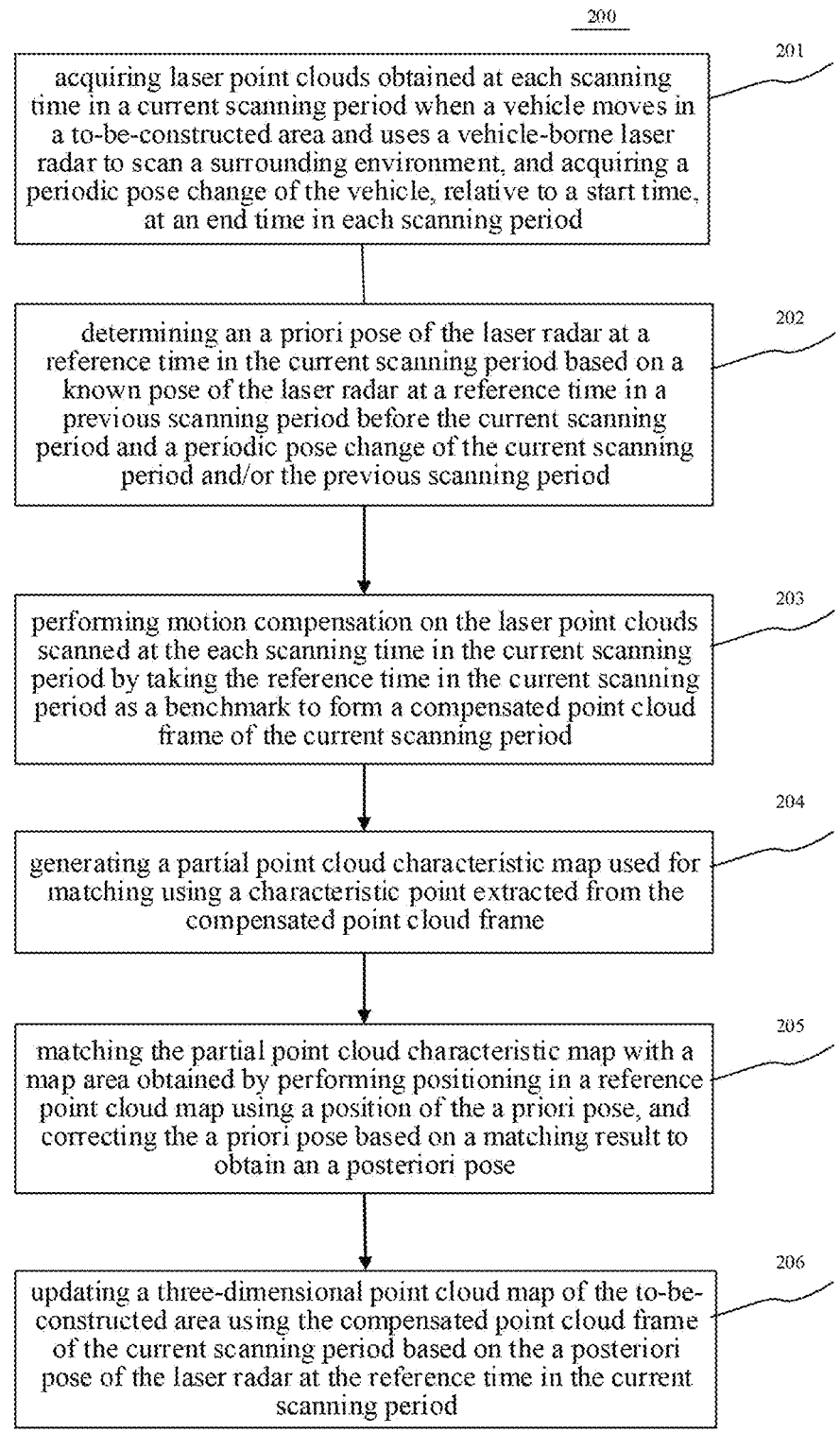
FIG. 2 is a flow diagram of an embodiment of the method for updating a map according to some embodiments of the present application.

Further referring to FIG. 2, it shows a process 200 of an embodiment of the method for updating the map according to some embodiments of the present application. The method for updating the map includes the following steps:

In Step 201, laser point clouds obtained at each scanning time in a current scanning period when a vehicle moves in a to-be-constructed area and uses a vehicle-borne laser radar to scan a surrounding environment are acquired, and a periodic pose change of the vehicle, relative to a start time, at an end time in each scanning period are acquired.

In some embodiments, an electronic device (e.g. the server shown in FIG. 1) on which the method for updating the map is operated may obtain the data collected by the vehicle through a vehicle-borne sensor from the vehicle in a wired connection mode or a wireless connection mode. Sensors including a vehicle-borne laser radar, a vehicle-borne inertial navigation system etc. may be mounted on the vehicle. The vehicle may move and open the vehicle-borne laser radar and the vehicle-borne inertial navigation system in a to-be-constructed area of the three-dimensional point cloud map required to be constructed to collect laser point clouds and measure and calculate the periodic pose change of the laser radar in each scanning period. Then, the electronic device may obtain the laser point clouds and the periodic pose change.

The vehicle-borne inertial navigation system may include measuring instruments, such as a triaxial accelerometer, a gyroscope measuring instrument etc., so that an acceleration $f_b$ and an angular velocity $\omega_b$ of the vehicle at each measuring time may be measured respectively, and a vehicle pose change $\xi_{b(i)}^{b(i-1)}$ of the vehicle at the measuring time may be calculated according to the acceleration $f_b$ and the angular speed $\omega_b$. Considering that the inertial navigation measuring frequency is much higher than the scanning frequency of the laser radar, the vehicle pose change $\xi_{b(k)}^{b}$ $(k-1)$ in a scanning period may be estimated by integrating the vehicle pose change at each measuring time, namely $$\xi_{b(k)}^{b(k-1)} = \prod_i \xi_{b(i)}^{b(i-1)}.$$

The pose of the vehicle relative to a navigation coordinate system at each measuring time in the scanning period may be characterized by a formula $\xi_{b(i)}^{n(i)} = \xi_{n(i-1)}^{n(i)} \cdot \xi_{b(i-1)}^{n(i-1)} \cdot \xi_{b(i-1)}^{b(i)}$. Wherein $\xi_{b(i)}^{b(i-1)}$ refers to a change of the vehicle pose at the ith time relative to the pose at a previous time i−1, and is mainly related to an angular velocity of rotation of the vehicle; and $\xi_{n(i-1)}^{n(i)}$ refers to a pose change of the navigation coordinate system, and is mainly related to a velocity of movement of the vehicle and an angular velocity of rotation of the earth. According to the two variables and in conjunction with the pose change $\xi_{b(i-1)}^{n(i-1)}$ of the vehicle under a navigation coordinate at a previous time, the pose change $\xi_{b(i)}^{n(i)}$ of the vehicle under the navigation coordinate at a current time may be iteratively derived. Then, the pose change $\xi_{b(i)}^{n(i)}$ of the vehicle at each measuring time relative to the navigation coordinate system may be integrated to obtain the pose change $\xi_{b(k)}^{n(k)}$ of the vehicle in the current scanning period relative to the navigation coordinate system.

The position change of the vehicle may be calculated through the following process: estimating an initial velocity $$v_0^k = \frac{\hat{T}_{k-1} - \hat{T}_{k-2}}{\Delta t}$$

of the vehicle in the current period according to positions $\hat{T}_{k-2}$ and $\hat{T}_{k-1}$ of the vehicle in the previous two scanning periods and a periodic time in the scanning period. In addition, the acceleration $a_i^k$ at each time may be calculated based on the pose, the estimation of the initial velocity and an accelerometer output of the vehicle, namely by using a velocity differential equation, namely $a_i^k = \xi_{b(i)}^{n(i)} f_b - (2\omega_{ie(i)}^{n(i)} + \omega_{en(i)}^{n(i)}) \times v_i^k + g$. Wherein, $\omega_{ie(i)}^{n(i)}$ is a projection of the angular velocity of rotation of the earth on the navigation coordinate system, $\omega_{en(i)}^{n(i)}$ is a projection of the rotation of the navigation coordinate system relative to the geodetic coordinate system, $f_b$ is a specific force measured by the accelerometer, $v_i^k$ is a velocity of the vehicle at a time i in the navigation coordinate system in the kth scanning period, and g is an acceleration of gravity. Using the initial velocity $v_0^k$ and the acceleration $a_i^k$ to perform integration, the position change T in the scanning period may be obtained, and the periodic pose change $\Delta P_k(\xi,T)$ of the laser radar in the kth scanning period is then obtained.

In Step 202, an a priori pose of the laser radar at a reference time in the current scanning period is determined based on a known pose of the laser radar at a reference time in a previous scanning period before the current scanning period and a periodic pose change of the current scanning period and/or the previous scanning period.

In some embodiments, based on the periodic pose change of each scanning period obtained in Step 201, the electronic device (for example, the server shown in FIG. 1) may calculate the periodic pose change of the laser radar in the current scanning period and/or the previous scanning period in conjunction with the known pose of the laser radar at the reference time in the previous scanning period of the current scanning period, so as to obtain the a priori pose of the laser radar at the reference time in the current scanning period. Wherein, the duration of each scanning period of the laser radar may be fixed, for example, 100 ms. The reference time in the scanning period may be a preset time in the scanning period. For example, it may be the initial time in the scanning period, the end time in the scanning period, or other times such as a center time point etc. When the reference time is the initial time in the scanning period, the a priori pose of the laser radar at the reference time (e.g., the initial time) of the current scanning period may be calculated by combining the known pose at the reference time (e.g., the initial time) of the previous scanning period with the periodic pose change of the laser radar in the previous scanning period. For example, the known pose $\hat{P}_{k-1}(\xi,T)$ of the laser radar at the initial time in the previous scanning period may be obtained through various methods. Based on the known pose $\hat{P}_{k-1}(\xi,T)$ and the periodic pose change $\Delta P_k(\xi,T)$ in the previous scanning period, the electronic device, through a formula $\overline{P}_k(\xi,T) = \Delta P_k(\xi,T) \cdot \hat{P}_{k-1}(\xi,T)$, may obtain the pose $\overline{P}_k(\xi,T)$, e.g., the a priori pose of the laser radar at the initial time in the current scanning period.

When the reference time is the end time in the scanning period, the a priori pose of the laser radar at the reference time (e.g., the end time) of the current scanning period may be calculated by combining the known pose at the reference time (e.g., the end time) of the previous scanning period with the periodic pose change of the laser radar in the current scanning period; and when the reference time is another time in the scanning period other than the initial time and the end time, the a priori pose at the reference time needs to be calculated through the periodic pose changes of the laser radar in the current scanning period and the previous scanning period and a corresponding proportion.

In Step 203, motion compensation is performed on the laser point clouds scanned at the each scanning time in the current scanning period by taking the reference time in the current scanning period as a benchmark to form a compensated point cloud frame of the current scanning period.

In some embodiments, the electronic device may take the reference time in the current period as a benchmark to perform pose adjustment on the laser point clouds scanned at each scanning time in the current scanning period so as to enable the laser point clouds to be mapped as a laser point clouds scanned by the laser radar which scans an identical area at the pose of the reference time, so that the compensated point cloud frame in the current scanning period may be formed according to the pose after motion compensation of each laser point.

In some optional implementations of the present embodiment, Step 203 described above may specifically include: determining a pose offset of the pose of the laser radar at each scanning time in the current scanning period relative to the a priori pose of the laser radar at the reference time in the current scanning period according to the periodic pose change of the current scanning period; and performing motion compensation on the corresponding laser point clouds scanned at the scanning time according to the pose offset of the laser radar at each scanning time in the current period, so as to generate the compensated point cloud frame of the current scanning period. In this implementation, the electronic device may fit out a pose change track of the laser radar in the current scanning period relative to the initial time according to the periodic pose change of the current scanning period and rotation parameters of the laser radar, so that the pose change quantity of each scanning time may be determined. The difference between the pose change quantity of each scanning time and the pose change quantity of the reference time may be set as the pose offset of the pose of the laser radar at this scanning time relative to the a priori pose of the laser radar at the reference time in the current scanning period. The pose after motion compensation of each laser point may be obtained by performing matrix multiplication on the pose offset of the laser radar at each scanning time in the current period and the pose offset of a laser point in an originally scanned laser point clouds, so that the laser points may be put together according to the pose after motion compensation of each laser point to form the compensated point cloud frame. If an original return position of the laser point clouds at a certain time is $x_t=[x, y, z]^T$, the pose offset of the laser radar at this time relative to the reference time is $P_t$, and then a point cloud coordinate after the motion compensation at this time is $x_t' = P_t \cdot x_t$.

In some optional implementations of the present embodiment, the determining the pose offset of the pose of the laser radar at each scanning time in the current scanning period relative to the a priori pose of the laser radar at the reference time in the current scanning period according to the periodic pose change of the current scanning period includes: calculating the pose offset of the pose of the laser radar at the each scanning time in the current scanning period relative to the a priori pose of the laser radar at the reference time in the current scanning period by considering the pose change of the laser radar in a single scanning period as a uniform change. In this implementation, the pose change of the laser radar in a single scanning period may be regarded as a uniform change to calculate the pose offset of the pose of the laser radar at each scanning time. In one scanning period, it is supposed that the initial time in the laser radar in the current scanning period is $t_0$, the end time is $t_1$, and the pose change of $t_1$ relative to time $t_0$ is $\Delta P(\xi,T)$, wherein $\xi$ is a posture change represented by a quaternion, and T=[Δx,Δy, Δz] represents a position change. The position change of the laser radar may be simplified as a uniform motion, and the posture change is simplified as a uniform rotation around a rotating shaft, so that in any time $t, t_0 \le t \le t_1$ in the scanning period, the pose $P_t(\xi_t, T_t)$ of the laser radar relative to an initial position may be estimated according to the following formula:

$$\begin{cases} T_t = \dfrac{t-t_0}{t_1-t_0} \cdot T \\ \xi_t = \dfrac{\sin(1-s)\omega}{\sin\omega} + \dfrac{\sin s\omega}{\sin\omega} \cdot \xi, s = \dfrac{t-t_0}{t_1-t_0} \end{cases}.$$

Wherein, sin ω is a module of a quaternion imaginary part.

By comparing the pose at each time relative to an initial position with the pose at the reference time, the pose offset of the pose at this time relative to the pose at the reference time may be obtained. For example, when the reference time is the initial time, the pose at each scanning time relative to the initial position is the pose offset of this scanning time relative to the reference time.

In Step 204, a partial point cloud characteristic map used for matching is generated using a characteristic point extracted from the compensated point cloud frame.

In some embodiments, based on the compensated point cloud frame obtained in Step 203, the electronic device may performing processing using the compensated point cloud frame to generate partial point cloud features for matching. Usually, the electronic device may extract characteristic points from the compensated point cloud frame in the current scanning period to form the partial point cloud characteristic map for following matching. It should be noted that the electronic device also may extract other characteristic points from compensated point cloud frames of other scanning periods, and combine the other characteristic points with the characteristic points extracted from the compensated point cloud frame in the current scanning period so as to generate the partial point cloud characteristic map.

In Step 205, the partial point cloud characteristic map is matched with a map area obtained by performing positioning in a reference point cloud map using a position of the a priori pose, and the a priori pose based on a matching result is corrected to obtain an a posteriori pose.

In some embodiments, based on the partial point cloud characteristic map generated in Step 204, the electronic device may further match the characteristic points in the partial point cloud characteristic map with the characteristic points of the map area which are obtained by performing positioning in the reference point cloud map using the position of the a priori pose. Wherein, the reference point cloud map is constructed by using laser point clouds obtained through static scanning of three-dimensional scanners deployed at fixed measurement stations of the to-be-constructed area. Precise coordinates of laser points of the reference point cloud map in a world coordinate system may be recorded in the reference point cloud map in advance. According to the marching result, the electronic device may correct the a priori pose so as to obtain the a posteriori pose after correction. During matching, an appropriate pose difference between the partial point cloud characteristic map and the map area may usually be determined according to characteristic distances between point characteristics, linear characteristics or face characteristics in the partial point cloud characteristic map and the map area, and the a priori pose is then corrected by using the pose difference to obtain the a posteriori pose after correction. A posteriori pose is obtained through matching, and the aim of the step is to change the pose of the point cloud frame from a radar coordinate system into a world coordinate system.

In Step 206, a three-dimensional point cloud map of the to-be-constructed area is updated using the compensated point cloud frame in the current scanning period based on the a posteriori pose of the laser radar at the reference time in the current scanning period.

In some embodiments, based on the processes from Step 201 to Step 205, the a posteriori pose of the laser radar at the reference time in the current scanning period may be obtained, and the electronic device adds the compensated point cloud frame corresponding to the current scanning period into the three-dimensional point cloud map according to the a posteriori pose to update the three-dimensional point cloud map.

In some optional implementations of the present embodiment, the method includes: setting the a posteriori pose of the laser radar at the reference time in the current scanning period as a known pose of the laser radar in the current scanning period to process laser point clouds scanned by the laser radar in a following scanning period. In this implementation, the a posteriori pose at the reference time in the current scanning period as the known pose of the laser radar in the current scanning period for following, the a posteriori pose calculated at the reference time in the previous scanning period may be used as an initial pose for calculating the a priori pose at the reference time in the next scanning period, the whole process needs the initial pose of the first scanning period, and the a posteriori pose of each scanning period can be calculated through iteration of the method without introducing an extra positioning device, so that the method has a high processing efficiency and a low cost.

According to the method provided by some embodiments of the present application, an accurate pose of the laser radar at the reference time point of each scanning period is continuously estimated and corrected through a pose change of the laser radar estimated by an inertial navigation system and the matching between the point cloud frame after motion compensation and the reference point cloud map, so that the three-dimensional point cloud map can be updated by using the point cloud frame after motion compensation of each scanning period according to the accurate pose, and a high-precision three-dimensional point cloud map may also be constructed in a scenario that it is impossible or difficult to give priority to the use of a global navigation satellite system to perform effective positioning.

Figure 3:
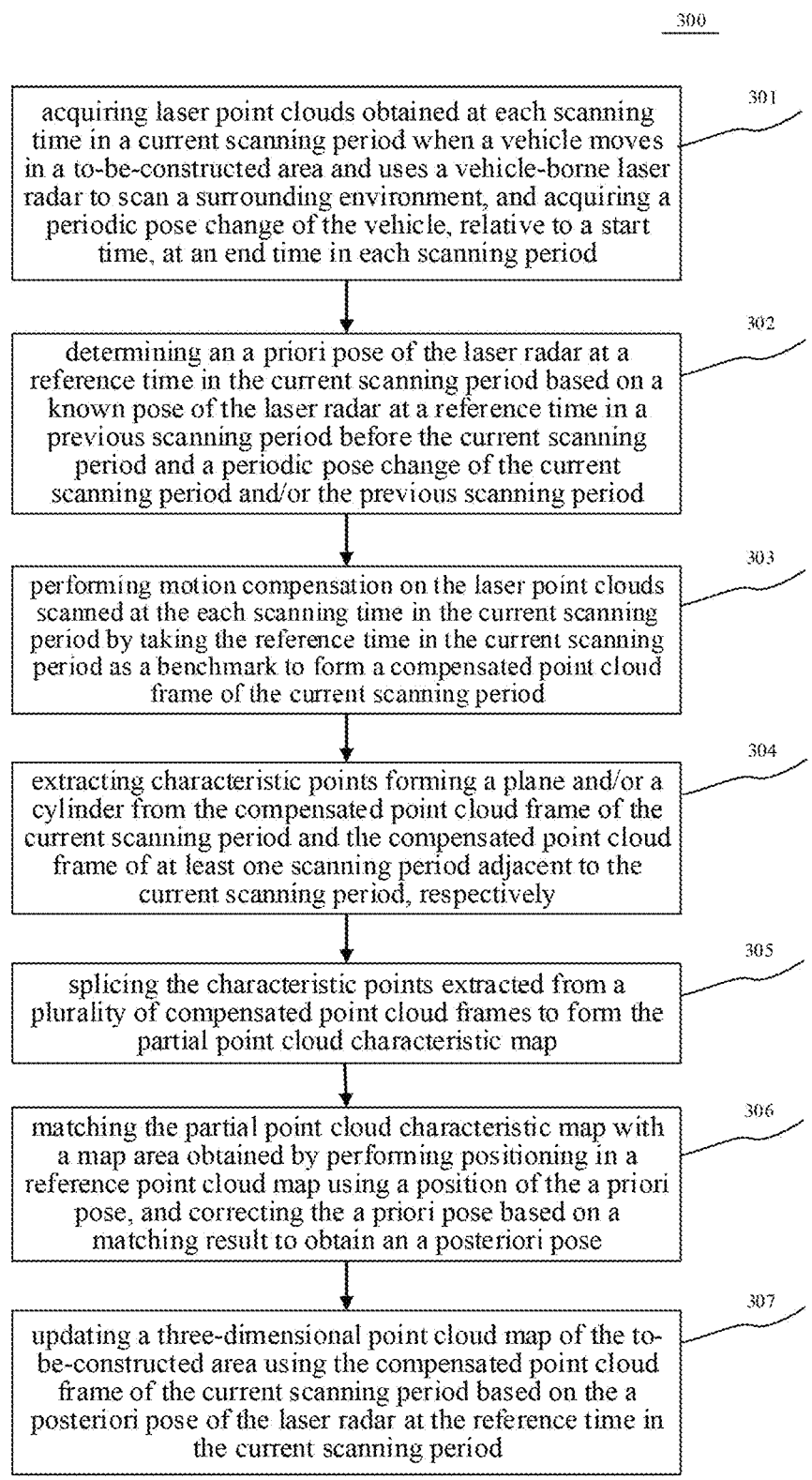
FIG. 3 is a flow diagram of another embodiment of the method for updating a map according to some embodiments of the present application.

Further referring to FIG. 3, it shows a process 300 of another embodiment of the method for updating the map. The process 300 of the method for updating the map includes the following steps:

In Step 301, laser point clouds obtained at each scanning time in a current scanning period when a vehicle moves in a to-be-constructed area and uses a vehicle-borne laser radar to scan a surrounding environment are acquired, and a periodic pose change of the vehicle, relative to a start time, at an end time in each scanning period is acquired.

In some embodiments, the specific processing of Step 301 may refer to Step 201, and no more details will be provided here.

In Step 302, an a priori pose of the laser radar at a reference time in the current scanning period is determined based on a known pose of the laser radar at a reference time in a previous scanning period before the current scanning period and a periodic pose change of the current scanning period and/or the previous scanning period.

In some embodiments, the specific processing of Step 302 may refer to Step 202 of the corresponding embodiment in FIG. 2, and no more details will be provided here.

In Step 303, motion compensation is performed on the laser point clouds scanned at the each scanning time in the current scanning period by taking the reference time in the current scanning period as a benchmark to form a compensated point cloud frame of the current scanning period.

In some embodiments, the specific processing of Step 303 may refer to Step 203 of the corresponding embodiment in FIG. 2, and no more details will be provided here.

In Step 304, characteristic points forming a plane and/or a cylinder from the compensated point cloud frame in the current scanning period and the compensated point cloud frame of at least one scanning period adjacent to the current scanning period are extracted, respectively.

In some embodiments, the electronic device may generate the compensated point cloud frame of at least one scanning period adjacent to the current scanning period in the same way as that of generating the compensated point cloud frame of the current scanning period. At this time, the electronic device may extract characteristic points forming a plane and/or a cylinder from the compensated point cloud frame in the current scanning period and the compensated point cloud frame of at least one scanning period adjacent to the current scanning period, respectively.

In Step 305, the characteristic points extracted from a plurality of compensated point cloud frames are spliced to form the partial point cloud characteristic map.

In some embodiments, based on the characteristic points extracted from the plurality of compensated point cloud frames in Step 304, the electronic device may put the characteristic points extracted from the compensated point cloud frames together to form the partial point cloud characteristic map. In some embodiments, the extracted characteristic points for forming the plane or the cylinder (the cylinder may be regarded as a straight line penetrating through a center) may be expressed as $f_k(c_k, n_k)$. For the formed plane, $c_k$ represents a center coordinate, and $n_k$ represents a normal vector of the plane; and for the formed cylinder, $c_k$ represents a center coordinate, and $n_k$ represents a direction of a straight line penetrating through the center of the cylinder. During follow-up matching, a characteristic distance d from any point p to the plane may be calculated through a formula $d=(p-c_k) \cdot n_k$, and a characteristic distance d from any point p to the cylinder (straight line) may be calculated through a formula $d=\|(p-c_k) \times n_k\|$. The characteristic distance between two compensated point cloud frames is minimized to ensure that relative poses of the compensated point cloud frames may be estimated. A plurality of frames of continuous point cloud characteristics are put together according to the estimated relative poses to obtain a partial characteristic map.

Figure 4A:
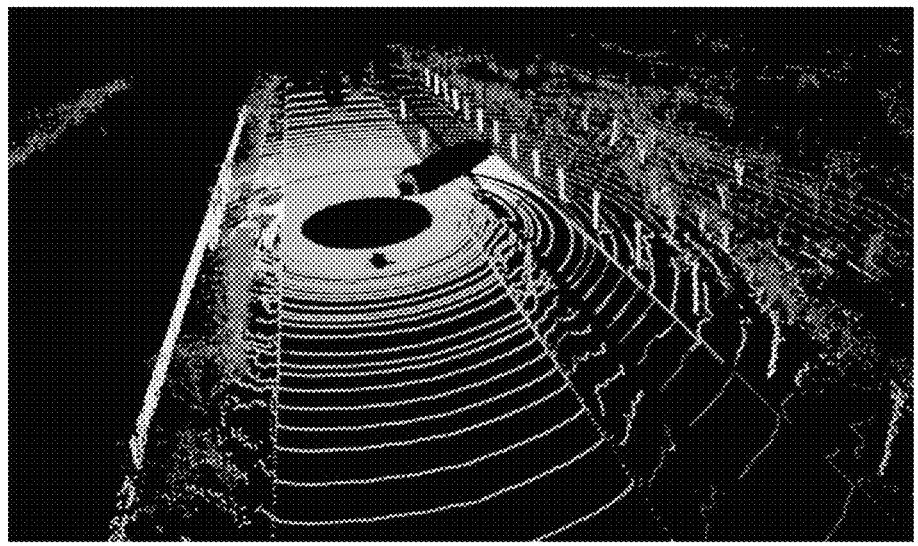
FIG. 4a and FIG. 4b are schematic diagrams of an effect of generating a partial point cloud characteristic map in the embodiment shown in FIG. 3.
Figure 4B:
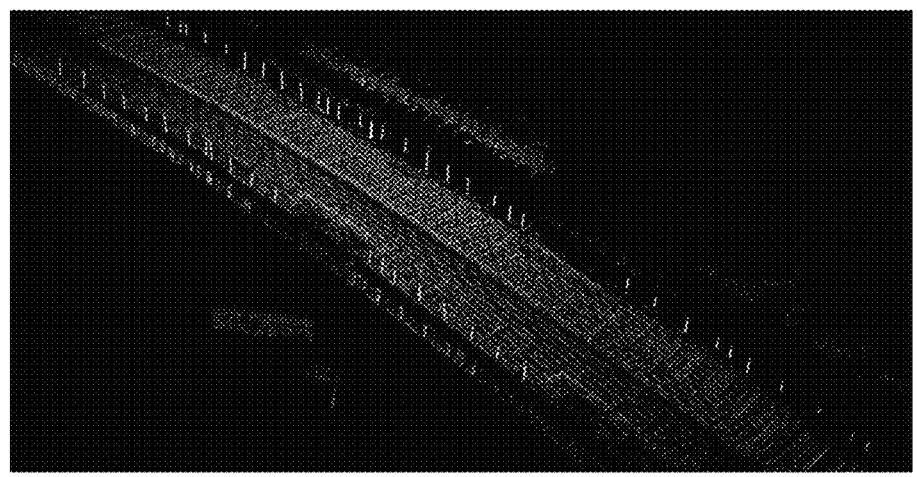

The processing effects of Step 304 and Step 305 are as shown in FIG. 4a and FIG. 4b. Wherein, FIG. 4a shows a point cloud frame after performing motion compensation in a single scanning period, the characteristic points forming the plane and/or the cylinder are extracted from a plurality of adjacent point cloud frames through Step 303 and Step 304, and the extracted characteristic points are put together to form the partial point cloud characteristic map shown in FIG. 4b. As shown in FIG. 4b, the formed partial point cloud characteristic map, compared with the point cloud frame of a single scanning period, may cover a wider range of areas, and characteristic objects in the map have more regularity, which is beneficial for improving the accuracy of matching.

In Step 306, the partial point cloud characteristic map is matched with a map area obtained by performing positioning in a reference point cloud map using a position of the a priori pose, and the a priori pose is corrected based on a matching result to obtain an a posteriori pose.

In some embodiments, it is supposed that the a priori pose of the laser radar at the reference time in the current scanning period is $\bar{p}_k$, a map area for matching captured from the reference point cloud map at a center of the position of the a priori pose $\bar{p}_k$ is $M_r$, and a partial map generated by the previous process is $M_l$. During point cloud matching, $M_r$ may be matched with $M_l$ to obtain the optimal pose difference $\Delta p$ between the two, and the a posteriori pose $\hat{p}_k$ may then be calculated through a formula $\hat{p}_k = \Delta p \cdot \bar{p}_k$.

In some optional implementations of the present embodiment, Step 306 may specifically include the following process: iteration adjustment is performed on the a priori pose of the laser radar at the reference time in the current period to enable the partial point cloud characteristic map after pose adjustment and the map area to reach an optimal matching state; and the a priori pose is corrected using an adjustment amount of the iteration adjustment to obtain an a posteriori pose. Optionally, during point cloud matching in the implementation, an iterative closest point (ICP) algorithm may be adopted to optimize target functions including but not limited to a standard ICP, a point-to-plane ICP, a GICP etc. A way of characteristic distance may be as described in Step 305.

In Step 307, a three-dimensional point cloud map of the to-be-constructed area using the compensated point cloud frame in the current scanning period is updated based on the a posteriori pose of the laser radar at the reference time in the current scanning period.

In some embodiments, the specific processing of Step 307 may refer to Step 206 in the corresponding embodiment in FIG. 2, and no more details will be provided here.

In some optional implementations of the present embodiment, the method further includes a step of generating a reference point cloud map, and the step of generating the reference point cloud map includes: measuring spatial coordinates of a three-dimensional scanner deployed at each measurement station of a to-be-constructed area station by station in a conductor control measurement mode; performing matching among laser point clouds obtained by scanning the surrounding environment by each three-dimensional scanner to obtain a pose of each three-dimensional scanner; and putting the laser point clouds scanned by each three-dimensional scanner together according to the spatial coordinates and the pose of each three-dimensional scanner to generate the reference point cloud map.

It can be seen from FIG. 3, compared with the corresponding embodiment in FIG. 2, the process 30 of the method for updating the map in the present embodiment highlights extracting the characteristic points for forming the plane and/or the cylinder from the compensated point cloud frame in the current scanning period and the compensated point cloud frame of at least one scanning period adjacent to the current scanning period respectively to form the partial point cloud characteristic map for matching with the reference point cloud map; and relative to using a single-frame point cloud as a partial map for matching, using a plurality of adjacent point cloud frames and removing characteristic points with unapparent characteristics in this manner are beneficial for improving the accuracy of matching.

Figure 5:
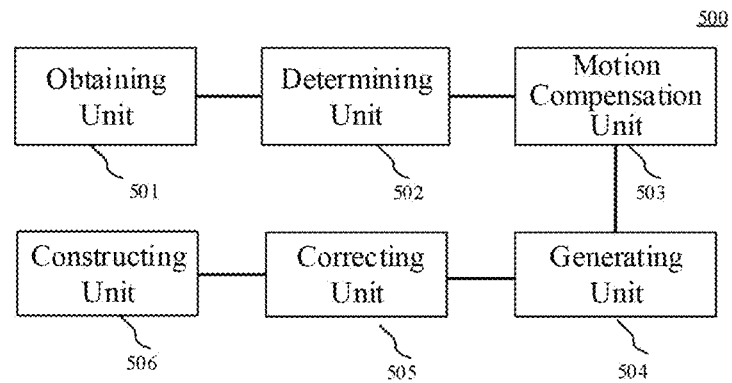
FIG. 5 is a structure diagram of an embodiment of the apparatus for updating a map according to some embodiments of the present application.

Further referring to FIG. 5, as the implementation of the method shown in the above figures, some embodiments of the present application provides an apparatus for updating a map, the embodiment of the apparatus corresponds to the embodiment of the method shown in FIG. 2, and the apparatus can be specifically applied to various types of electronic devices.

As shown in FIG. 5, the apparatus 500 for updating the map in some embodiments includes: an acquiring unit 501, a determining unit 502, a motion compensation unit 503, a generating unit 504, a correcting unit 505 and a constructing unit 506. Wherein, the obtaining unit 501 is used for acquiring laser point clouds obtained at each scanning time in a current scanning period when a vehicle moves in a to-be-constructed area and uses a vehicle-borne laser radar to scan a surrounding environment, and acquiring a periodic pose change of the vehicle, relative to a start time, at an end time in each scanning period, the periodic pose change obtained by a vehicle-borne inertial navigation system of the vehicle through measurement and calculation; the determining unit 502 is used for determining an a priori pose of the laser radar at a reference time in the current scanning period based on a known pose of the laser radar at a reference time in a previous scanning period before the current scanning period and a periodic pose change of the current scanning period and/or the previous scanning period; the motion compensation unit 503 is used for performing motion compensation on the laser point clouds scanned at the each scanning time in the current scanning period by taking the reference time in the current scanning period as a benchmark to forma compensated point cloud frame of the current scanning period; the generating unit 504 is used for generating a partial point cloud characteristic map used for matching using a characteristic point extracted from the compensated point cloud frame; the correcting unit 505 is used for matching the partial point cloud characteristic map with a map area obtained by performing positioning in a reference point cloud map using a position of the a priori pose, and correcting the a priori pose based on a matching result to obtain an a posteriori pose, the reference point cloud map constructed by using laser point clouds obtained through static scanning by three-dimensional scanners deployed at fixed measurement stations of the to-be-constructed area; and the constructing unit 506 is used for updating a three-dimensional point cloud map of the to-be-constructed area using the compensated point cloud frame in the current scanning period based on the a posteriori pose of the laser radar at the reference time in the current scanning period.

In some embodiments, the specific processing of the acquiring unit 501, the determining unit 502, the motion compensation unit 503, the generating unit 504, the correcting unit 505 and the constructing unit 506 may refer to Step 201, Step 202, Step 203, Step 204, Step 205 and Step 206 in the corresponding embodiment in FIG. 2, and no more details will be provided here.

In some optional implementations of the present embodiment, the acquiring unit 501 is further used for: measuring a periodic pose change of a vehicle at the end time relative to the initial time in the current scanning period by using a vehicle-borne inertial navigation system of the vehicle. The specific processing of the implementation can refer to a corresponding implementation in the corresponding embodiment in FIG. 2, and no more details will be provided here.

In some optional implementations of the present embodiment, the apparatus 500 further includes: a setting unit (not shown), for setting the a posteriori pose of the laser radar at the reference time in the current scanning period as a known pose of the laser radar in the current scanning period to process laser point clouds scanned by the laser radar in a following scanning period.

In some optional implementations of the present embodiment, the motion compensation unit 503 may include: a determining subunit (not shown), for determining a pose offset of the pose of the laser radar at the each scanning time in the current scanning period relative to the a priori pose of the laser radar at the reference time in the current scanning period based on the periodic pose change of the current scanning period and/or the previous scanning period; and a motion compensation subunit (not shown), for performing motion compensation on the corresponding laser point clouds scanned at the scanning time based on the pose offset of the laser radar at the each scanning time in the current period, to generate the compensated point cloud frame of the current scanning period. The specific processing of the implementation can refer to a corresponding implementation in the corresponding embodiment in FIG. 2, and no more details will be provided here.

In some optional implementations of the present embodiment, the determining subunit is further used for: calculating the pose offset of the pose of the laser radar at the each scanning time in the current scanning period relative to the a priori pose of the laser radar at the reference time in the current scanning period by considering the pose change of the laser radar in a single scanning period as a uniform change. The specific processing of the implementation can refer to a corresponding implementation in the corresponding embodiment in FIG. 2, and no more details will be provided here.

In some optional implementations of the present embodiment, the generating unit 504 may be further used for: extracting characteristic points forming a plane and/or a cylinder from the compensated point cloud frame in the current scanning period and the compensated point cloud frame of at least one scanning period adjacent to the current scanning period, respectively; and splicing the characteristic points extracted from a plurality of compensated point cloud frames to form the partial point cloud characteristic map. The specific processing of the implementation can refer to corresponding steps in the corresponding embodiment in FIG. 3, and no more details will be provided here.

In some optional implementations of the present embodiment, the correcting unit 505 may be further used for: performing an iterative adjustment on the a priori pose of the laser radar at the reference time in the current period to enable the partial point cloud characteristic map after pose adjustment and the map area to reach an optimal matching state; and correcting the a priori pose using an adjustment amount of the iterative adjustment to obtain the a posteriori pose. The specific processing of the implementation can refer to a corresponding implementation in the corresponding embodiment in FIG. 3, and no more details will be provided here.

In some optional implementations of the present embodiment, the apparatus 500 further includes a reference point cloud map generating unit which is used for: measuring spatial coordinates of a three-dimensional scanner deployed at each measurement station of the to-be-constructed area station-by-station in a conductor line controlled measurement mode; performing matching among laser point clouds obtained by scanning a surrounding environment by each three-dimensional scanner to obtain a pose of the each three-dimensional scanner; and splicing the laser point clouds scanned by the each three-dimensional scanner based on the spatial coordinates and the pose of the each three-dimensional scanner to generate the reference point cloud map. The specific processing of the implementation can refer to a corresponding implementation in the corresponding embodiment in FIG. 3, and no more details will be provided here.

Figure 6:
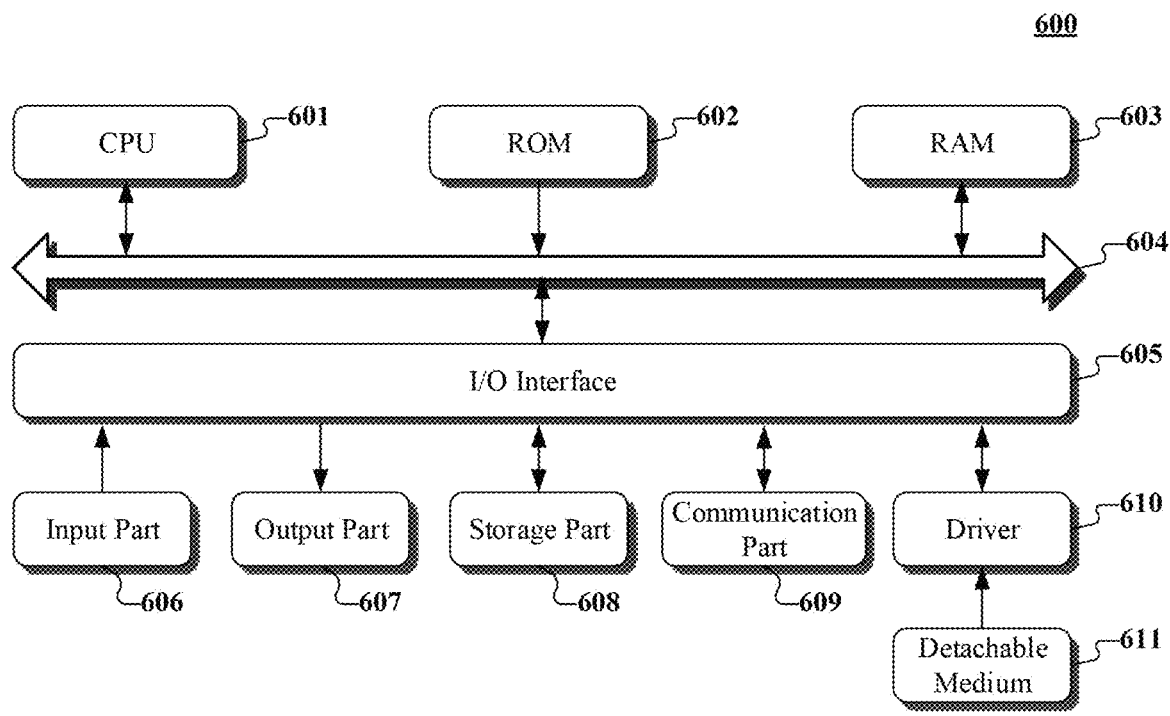
FIG. 6 is a structure diagram of a computer system suitable for implementing the equipment according to some embodiments of the present application.

In addition, some embodiments of the present application further provides a device which usually may be a server. The device may include: one or more processors, and a storage for storing one or more programs, wherein when the one or more programs are executed by the one or more processors, the one or more processors implement the method as described in the embodiment corresponding to FIG. 2 or FIG. 3 or any optional implementation. FIG. 6 shows a structure diagram of a computer system 600 suitable for implementing the equipment according to some embodiments of the present application. The device shown in FIG. 6 is just an example, which does not impose any restrictions on the functionality and scope of application of the embodiments of the present application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606; an output portion 607; a storage portion 608 including a hard disk; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of some embodiments of the present application. It needs to be noted that the computer readable medium in the present disclosure may be computer readable signal medium or computer readable storage medium or a combination thereof. An example of the computer readable storage medium may include but not limited to: systems, apparatus or elements of electric, magnet, optical, electro-magnet, infrared ray, or semiconductor or a combination thereof. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or a combination thereof. In some embodiments of the present disclosure, the computer readable storage medium may be any physical medium containing or storing programs which can be used by a command execution system, apparatus or element or the incorporation thereof. In some embodiments of the present disclosure, the computer readable signal medium may include data signal in the base band or propagating as parts of a carrier in which computer readable program codes are carried. The propagated signal may take various forms, include but is not limited to: an electromagnetic signal, an optical signal or a combination thereof. The signal medium that can be read by computer may be any computer readable medium except for the computer readable storage medium. The computer readable medium is capable of transmitting, propagating or transferring programs for used by or used in combination with a command execution system, apparatus or element. The program codes contained on the computer readable medium may be transmitted with any suitable medium including but not limited to: a wireless medium, a wired medium, an optical cable medium, a RF medium and the like, or any combination thereof.

The flowcharts and block diagrams in the figures illustrate architectures, functions and operations that may be implemented according to the system, the method and the computer program product of the various embodiments. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flowcharts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising: an acquiring unit, a determining unit, a motion compensation unit, a generating unit, a correcting unit and a constructing unit, where the names of these units or modules are not considered as a limitation to the units or modules. For example, the acquiring unit may also be described as "a unit for acquiring laser point clouds obtained at each scanning time in a current scanning period when a vehicle moves in a to-be-constructed area and uses a vehicle-borne laser radar to scan a surrounding environment, and acquiring a periodic pose change of the vehicle, relative to a start time, at an end time in each scanning period.

In another aspect, some embodiments of the present application further provide a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: acquire laser point clouds obtained at each scanning time in a current scanning period when a vehicle moves in a to-be-constructed area and uses a vehicle-borne laser radar to scan a surrounding environment, and acquire a periodic pose change of the vehicle, relative to a start time, at an end time in each scanning period, the periodic pose change obtained by a vehicle-borne inertial navigation system of the vehicle through measurement and calculation; determine an a priori pose of the laser radar at a reference time in the current scanning period based on a known pose of the laser radar at a reference time in a previous scanning period before the current scanning period and a periodic pose change of the current scanning period and/or the previous scanning period; perform motion compensation on the laser point clouds scanned at the each scanning time in the current scanning period by taking the reference time in the current scanning period as a benchmark to form a compensated point cloud frame of the current scanning period; generate a partial point cloud characteristic map used for matching using a characteristic point extracted from the compensated point cloud frame; match the partial point cloud characteristic map with a map area obtained by performing positioning in a reference point cloud map using a position of the a priori pose, and correct the a priori pose based on a matching result to obtain an a posteriori pose, the reference point cloud map constructed by using laser point clouds obtained through static scanning by three-dimensional scanners deployed at fixed measurement stations of the to-be-constructed area; and update a three-dimensional point cloud map of the to-be-constructed area using the compensated point cloud frame in the current scanning period based on the a posteriori pose of the laser radar at the reference time in the current scanning period.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present application with (but not limited to), technical features with similar functions. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for updating a map, the method comprising:
  acquiring laser point clouds obtained at each scanning time in a current scanning period in response to a vehicle moving in a to-be-constructed area and using a vehicle-borne laser radar to scan a surrounding environment, and acquiring a periodic pose change of the vehicle, relative to a start time, at an end time in each scanning period, the periodic pose change obtained by a vehicle-borne inertial navigation system of the vehicle through measurement and calculation;
  determining an a priori pose of the laser radar at a reference time in the current scanning period based on a known pose of the laser radar at a reference time in a previous scanning period before the current scanning period and a periodic pose change of the current scanning period and/or the previous scanning period;
  performing motion compensation on the laser point clouds scanned at the each scanning time in the current scanning period by taking the reference time in the current scanning period as a benchmark to form a compensated point cloud frame of the current scanning period;
  generating a partial point cloud characteristic map used for matching using a characteristic point extracted from the compensated point cloud frame;
  matching the partial point cloud characteristic map with a map area obtained by performing positioning in a reference point cloud map using a position of the a priori pose, and correcting the a priori pose based on a matching result to obtain an a posteriori pose, the reference point cloud map constructed by using laser point clouds obtained through static scanning by three-dimensional scanners deployed at fixed measurement stations of the to-be-constructed area; and
  updating a three-dimensional point cloud map of the to-be-constructed area using the compensated point cloud frame in the current scanning period based on the a posteriori pose of the laser radar at the reference time in the current scanning period,
  wherein the method is performed by at least one processor.

2. The method according to claim 1, the method further comprising:
  setting the a posteriori pose of the laser radar at the reference time in the current scanning period as a known pose of the laser radar in the current scanning period to process laser point clouds scanned by the laser radar in a following scanning period.

3. The method according to claim 1, wherein performing motion compensation on the laser point clouds scanned at the each scanning time in the current scanning period by taking the reference time in the current scanning period as a benchmark to form a compensated point cloud frame of the current scanning period comprises:
  determining a pose offset of the pose of the laser radar at the each scanning time in the current scanning period relative to the a priori pose of the laser radar at the reference time in the current scanning period based on the periodic pose change of the current scanning period and/or the previous scanning period; and
  performing motion compensation on the corresponding laser point clouds scanned at the scanning time based on the pose offset of the laser radar at the each scanning time in the current period, to generate the compensated point cloud frame of the current scanning period.

4. The method according to claim 3, wherein determining a pose offset of the pose of the laser radar at the each scanning time in the current scanning period relative to the a priori pose of the laser radar at the reference time in the current scanning period based on the periodic pose change of the current scanning period comprises:

calculating the pose offset of the pose of the laser radar at the each scanning time in the current scanning period relative to the a priori pose of the laser radar at the reference time in the current scanning period by considering the pose change of the laser radar in a single scanning period as a uniform change.

5. The method according to claim 1, wherein generating a partial point cloud characteristic map used for matching using a characteristic point extracted from the compensated point cloud frame comprises:

extracting characteristic points forming a plane and/or a cylinder from the compensated point cloud frame in the current scanning period and the compensated point cloud frame of at least one scanning period adjacent to the current scanning period, respectively; and splicing the characteristic points extracted from a plurality of compensated point cloud frames to form the partial point cloud characteristic map.

6. The method according to claim 1, wherein matching the partial point cloud characteristic map with a map area obtained by performing positioning in a reference point cloud map using a position of the a priori pose, and correcting the a priori pose based on a matching result to obtain an a posteriori pose comprises:

performing an iterative adjustment on the a priori pose of the laser radar at the reference time in the current period to enable the partial point cloud characteristic map after pose adjustment and the map area to reach an optimal matching state; and correcting the a priori pose using an adjustment amount of the iterative adjustment to obtain the a posteriori pose.

7. The method according to claim 1, wherein the method further comprises generating the reference point cloud map, and the generating comprises:

measuring spatial coordinates of a three-dimensional scanner deployed at each measurement station of the to-be-constructed area station-by-station in a conductor line controlled measurement mode;

performing matching among laser point clouds obtained by scanning a surrounding environment by each three-dimensional scanner to obtain a pose of the each three-dimensional scanner; and splicing the laser point clouds scanned by the each three-dimensional scanner based on the spatial coordinates and the pose of the each three-dimensional scanner to generate the reference point cloud map.

8. An apparatus for updating a map, the apparatus comprising:

at least one processor; and a memory storing instructions, which when executed by the at least one processor, cause the at least one processor to perform operations comprising:

acquiring laser point clouds obtained at each scanning time in a current scanning period in response to a vehicle moving in a to-be-constructed area and using a vehicle-borne laser radar to scan a surrounding environment, and acquiring a periodic pose change of the vehicle, relative to a start time, at an end time in each scanning period, the periodic pose change obtained by a vehicle-borne inertial navigation system of the vehicle through measurement and calculation;

determining an a priori pose of the laser radar at a reference time in the current scanning period based on a known pose of the laser radar at a reference time in a previous scanning period before the current scanning period and a periodic pose change of the current scanning period and/or the previous scanning period;

performing motion compensation on the laser point clouds scanned at the each scanning time in the current scanning period by taking the reference time in the current scanning period as a benchmark to form a compensated point cloud frame of the current scanning period;

generating a partial point cloud characteristic map used for matching using a characteristic point extracted from the compensated point cloud frame;

matching the partial point cloud characteristic map with a map area obtained by performing positioning in a reference point cloud map using a position of the a priori pose, and correcting the a priori pose based on a matching result to obtain an a posteriori pose, the reference point cloud map constructed by using laser point clouds obtained through static scanning by three-dimensional scanners deployed at fixed measurement stations of the to-be-constructed area; and updating a three-dimensional point cloud map of the to-be-constructed area using the compensated point cloud frame in the current scanning period based on the a posteriori pose of the laser radar at the reference time in the current scanning period.

9. The apparatus according to claim 8, the operations further comprise:

setting the a posteriori pose of the laser radar at the reference time in the current scanning period as a known pose of the laser radar in the current scanning period to process laser point clouds scanned by the laser radar in a following scanning period.

10. The apparatus according to claim 8, wherein performing motion compensation on the laser point clouds scanned at the each scanning time in the current scanning period by taking the reference time in the current scanning period as a benchmark to form a compensated point cloud frame of the current scanning period comprises:

determining a pose offset of the pose of the laser radar at the each scanning time in the current scanning period relative to the a priori pose of the laser radar at the reference time in the current scanning period based on the periodic pose change of the current scanning period and/or the previous scanning period; and performing motion compensation on the corresponding laser point clouds scanned at the scanning time based on the pose offset of the laser radar at the each scanning time in the current period, to generate the compensated point cloud frame of the current scanning period.

11. The apparatus according to claim 10, wherein determining a pose offset of the pose of the laser radar at the each scanning time in the current scanning period relative to the a priori pose of the laser radar at the reference time in the current scanning period based on the periodic pose change of the current scanning period comprises:

calculating the pose offset of the pose of the laser radar at the each scanning time in the current scanning period relative to the a priori pose of the laser radar at the reference time in the current scanning period by considering the pose change of the laser radar in a single scanning period as a uniform change.

12. The apparatus according to claim 8, wherein generating a partial point cloud characteristic map used for matching using a characteristic point extracted from the compensated point cloud frame comprises:

extracting characteristic points forming a plane and/or a cylinder from the compensated point cloud frame in the current scanning period and the compensated point cloud frame of at least one scanning period adjacent to the current scanning period, respectively; and splicing the characteristic points extracted from a plurality of compensated point cloud frames to form the partial point cloud characteristic map.

13. The apparatus according to claim 8, wherein matching the partial point cloud characteristic map with a map area obtained by performing positioning in a reference point cloud map using a position of the a priori pose, and correcting the a priori pose based on a matching result to obtain an a posteriori pose comprises:

performing an iterative adjustment on the a priori pose of the laser radar at the reference time in the current period to enable the partial point cloud characteristic map after pose adjustment and the map area to reach an optimal matching state; and correcting the a priori pose using an adjustment amount of the iterative adjustment to obtain the a posteriori pose.

14. The apparatus according to claim 8, wherein the operations further comprise generating the reference point cloud map, and the generating comprises:

measuring spatial coordinates of a three-dimensional scanner deployed at each measurement station of the to-be-constructed area station-by-station in a conductor line controlled measurement mode;

performing matching among laser point clouds obtained by scanning a surrounding environment by each three-dimensional scanner to obtain a pose of the each three-dimensional scanner; and splicing the laser point clouds scanned by the each three-dimensional scanner based on the spatial coordinates and the pose of the each three-dimensional scanner to generate the reference point cloud map.

15. A non-transitory computer storage medium on which computer programs are stored, which when executed by a processor, cause the processor to perform operations comprising:

acquiring laser point clouds obtained at each scanning time in a current scanning period in response to a vehicle moving in a to-be-constructed area and using a vehicle-borne laser radar to scan a surrounding environment, and acquiring a periodic pose change of the vehicle, relative to a start time, at an end time in each scanning period, the periodic pose change obtained by a vehicle-borne inertial navigation system of the vehicle through measurement and calculation;

determining an a priori pose of the laser radar at a reference time in the current scanning period based on a known pose of the laser radar at a reference time in a previous scanning period before the current scanning period and a periodic pose change of the current scanning period and/or the previous scanning period;

performing motion compensation on the laser point clouds scanned at the each scanning time in the current scanning period by taking the reference time in the current scanning period as a benchmark to form a compensated point cloud frame of the current scanning period;

generating a partial point cloud characteristic map used for matching using a characteristic point extracted from the compensated point cloud frame;

matching the partial point cloud characteristic map with a map area obtained by performing positioning in a reference point cloud map using a position of the a priori pose, and correcting the a priori pose based on a matching result to obtain an a posteriori pose, the reference point cloud map constructed by using laser point clouds obtained through static scanning by three-dimensional scanners deployed at fixed measurement stations of the to-be-constructed area; and updating a three-dimensional point cloud map of the to-be-constructed area using the compensated point cloud frame in the current scanning period based on the a posteriori pose of the laser radar at the reference time in the current scanning period.

* * * * *